(12) United States Patent
Schneider et al.

(10) Patent No.: US 9,030,671 B2
(45) Date of Patent: May 12, 2015

(54) MEASURING ASSEMBLY FOR MEASURING A SPECTACLE FRAME

(75) Inventors: Gunter Schneider, Marburg (DE); Torsten Gerrath, Marburg (DE); Ulf Boerner, Marburg (DE)

(73) Assignee: Schneider GmbH & Co. KG, Fronhausen (DE)

( * ) Notice: Subject to any disclaimer, the term of this patent is extended or adjusted under 35 U.S.C. 154(b) by 366 days.

(21) Appl. No.: 13/581,853

(22) PCT Filed: Mar. 3, 2011

(86) PCT No.: PCT/EP2011/053150
§ 371 (c)(1),
(2), (4) Date: Oct. 18, 2012

(87) PCT Pub. No.: WO2011/107529
PCT Pub. Date: Sep. 9, 2011

(65) Prior Publication Data
US 2013/0027709 A1    Jan. 31, 2013

(30) Foreign Application Priority Data
Mar. 4, 2010  (DE) .......................... 10 2010 010 340

(51) Int. Cl.
| G01B 11/30 | (2006.01) |
| --- | --- |
| G01B 9/00 | (2006.01) |
| A61B 3/10 | (2006.01) |
| B24B 1/00 | (2006.01) |
| B24B 41/06 | (2012.01) |

(Continued)

(52) U.S. Cl.
CPC ................ *G01B 11/24* (2013.01); *G02C 13/00* (2013.01); *B24B 9/14* (2013.01); *B24B 9/144* (2013.01)

(58) Field of Classification Search
CPC .......... B24B 9/144; B24B 9/14; G01B 11/24; G02C 13/00
USPC ............ 356/124–127, 445, 372; 451/42, 390; 156/64; 33/200
See application file for complete search history.

(56) References Cited

U.S. PATENT DOCUMENTS

| 4,368,958 A | * | 1/1983 | Buget ........................ 351/204 |
| 5,121,550 A | | 6/1992 | Wood et al. |

(Continued)

FOREIGN PATENT DOCUMENTS

| DE | 44 07 518 A1 | 9/1995 |
| DE | 197 25 159 C1 | 7/1998 |

(Continued)

*Primary Examiner* — Tarifur Chowdhury
*Assistant Examiner* — Sunghee Y Gray
(74) *Attorney, Agent, or Firm* — Hudak, Shunk & Farine Co. LPA

(57) ABSTRACT

A measuring assembly for measuring an inside of a lens frame of a spectacle frame, said lens frame at least partially delimiting an inscribed surface area F that corresponds to a lens shape, comprising a holding device for mounting the spectacle frame, at least one light source for generating a light beam to be projected on a region of the lens frame to be evaluated, and at least one sensor that can be coupled to an evaluation unit for detecting the reflected light beam, wherein the holding device can be rotated about a rotational axis r and moved in the direction of a movement axis x, and the movement axis x comprises at least one movement component in a direction perpendicular to the rotational axis r. The holding device is used to fix the spectacle frame by spectacle frame bows, wherein at least one free space is provided in the region of the holding device, said free space being used to receive the spectacle frame bows of a spectacle frame to be held which are not folded in or cannot be folded in.

16 Claims, 3 Drawing Sheets

(51) Int. Cl.
*B32B 37/00* (2006.01)
*G01B 11/24* (2006.01)
*G02C 13/00* (2006.01)
*B24B 9/14* (2006.01)

(56) References Cited

U.S. PATENT DOCUMENTS 5,515,612 A * 5/1996 Igarashi et al. ............... 33/200
6,122,063 A   9/2000 Berndt
2002/0166247 A1 * 11/2002 Andrews et al. ............... 33/200
2009/0140036 A1 *  6/2009 Haddadi ....................... 235/375
2010/0064533 A1 *  3/2010 Miyashita ...................... 33/200

FOREIGN PATENT DOCUMENTS

| | | |
|---|---|---|
| DE | 199 26 439 C1 | 12/2000 |
| DE | 100 49 382 A1 | 4/2002 |
| DE | 696 37 346 T2 | 10/2008 |
| EP | 0 974 038 B1 | 8/2002 |
| WO | 2008 093332 A2 | 8/2008 |

* cited by examiner

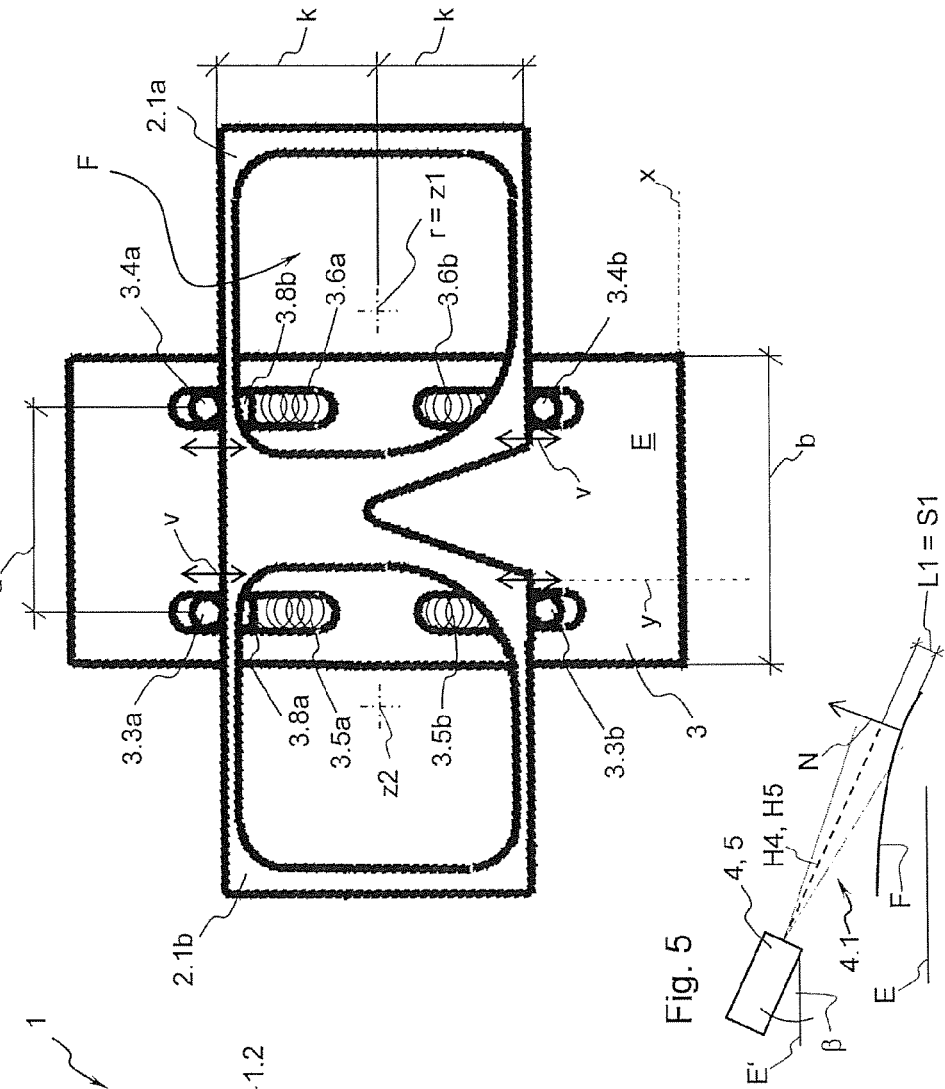
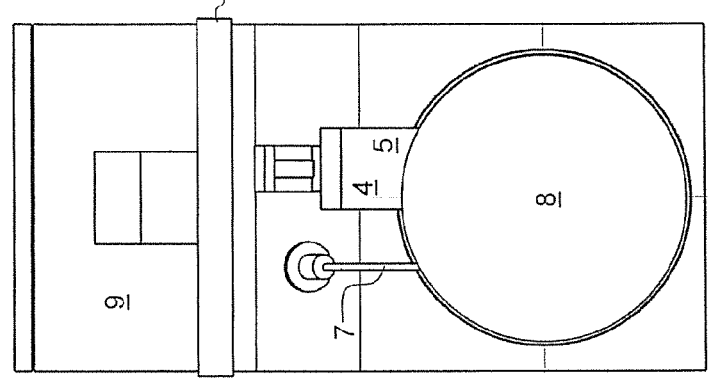

MEASURING ASSEMBLY FOR MEASURING A SPECTACLE FRAME

FIELD OF THE INVENTION

The invention relates to a measuring assembly for optically measuring an inside of a lens frame of a spectacle frame, said lens frame at least partially delimiting an inscribed and usually curved surface area F that corresponds to a lens shape, comprising a holding device for mounting the spectacle frame, at least one light source for generating a line-shaped light beam to be projected on a region of the lens frame to be evaluated, and at least one sensor that can be coupled with an evaluation unit for detecting the reflected light beam, wherein the holding device can be rotated about a rotational axis r and moved in the direction of a movement axis x, and the movement axis x comprises at least one movement component in a direction perpendicular to the rotational axis r.

BACKGROUND OF THE INVENTION

A measuring assembly for the non-contact detection of a 3-dimensional spatial form of a groove running circumferentially in a spectacle frame is already known from EP 0 974 038 B1, comprising a light source whose light beam is directed at the groove or can be redirected onto it by means of an optical deflection system, an optical imaging system that images the light reflected from the groove onto an optical detector unit and is disposed essentially centered to the groove, of the spectacle frame, to be measured, a holding device that supports the spectacle frame and that is supported in a rotatable manner relative to the light source, the detector arrangement as well as the optical imaging system about a centering axis of a surface area inscribed by the circumferentially running groove of the spectacle frame, for the measurement of the 3-dimensional spatial form of the groove, wherein the light source illuminates the groove with a single, line-shaped beam and the light beam of the light source is directed at the surface area inscribed by the circumferentially running groove of the spectacle frame essentially perpendicularly, as well as an analysis unit that determines the 3-dimensional spatial form of the groove and that operates according to the light section method.

From DE 100 49 382 AI a measuring assembly for the measurement of the geometry of lens edges is known. It likewise comprises an illumination device and a monitoring unit that is disposed at a triangulation angle. The measurement of the open frame edge, in contrast to the measurement of a spectacle frame, does not involve the problem of the interior side of the lens frame to be measured, which is closed to the outside and insofar inaccessible in the radial direction from the outside.

DE 696 37 346 T2 describes a lens measuring device, describing it with a receptacle for the spectacles as a whole. For the purpose of the evaluation of the lens or the spectacle glass the spectacles are translationally displaced in two different directions. A rotation of the spectacles is not possible due to the receptacle body that extends in the radial direction to the lens.

A tactile tracer is described in U.S. Pat. No. 5,121,550 A that involves the rotation of the tactile probe head across the extend of the frame for the purpose of measuring different measurement points. A rotation of the held piece does not take place.

SUMMARY OF THE INVENTION it is the object of the invention to implement and arrange a measuring assembly in such a manner that a quicker and more accurate measurement as well as automation of the measurement is assured.

The object is achieved according to the invention in that the holding device is used to fixate the spectacle frame by means of spectacle frame bows, wherein at least one open space is provided in the region of the holding device, said open space being used to receive the spectacle frame bows of a spectacle frame to be held, said spectacle frame bows are not folded in or cannot be folded in, wherein the open space is provided on the side of the lens frame that is facing away from the light source and/or the sensor. The spectacle frame including the spectacle frame bow can therefore be translationally moved and rotated to the required extent, without that this movement or the measurement would be affected by the bows. The creation of the open space is associated with a redesign of the setup that was common up until now, which can be compared to a measuring table, so that the measurement of any spectacle frame, even automatically, is assured. The holding device forms quasi a sufficiently high pedestal on which the complete spectacle frame is fixated with folded-up spectacle frame bows, wherein the spectacle frame bows laterally flank the pedestal. The height of the pedestal is therefore at least as long as the length of the flanking spectacle frame bows.

The single translation axis x is driven via a pairing of a rigid gear rack and a sprocket in rolling contact thereto, wherein the support and guide rail runs parallel to the gear rack or is an integral part thereof. An additional translational movement axis with a movement component in a direction perpendicular to movement axis x is not necessary for the holding device. The alignment in that direction takes place by means of the clamping elements that are pretensionable in the y direction.

To that effect it can also be advantageous if the holding device has at least two clamping elements for fixating the lens frame that are movable in a direction of a movement axis y with a movement component perpendicular to the movement axis x and with a movement component perpendicular to the rotational axis r and that are pretensionable against the lens frame. The clamping elements' ability to move and to be pretensioned in the direction of the movement axis y assures an alignment of the lens frame to be clamped or fixated in just that direction. An alignment of the lens frame relative to the rotational axis r is possible without an additional translational axis because the movement axis y has a directional component perpendicular to the movement axis x and the rotational axis r.

Furthermore it can be advantageous if the clamping elements comprise drive and/or pretensioning means, wherein the respective clamping element has the same pretension and/or the same distance k in the direction of the movement axis y in reference to the direction of the movement axis y while the lens frame is fixated. If the same distance k to the rotational axis is assured, a lens frame fixated between the clamping elements is also centered midway to the rotational axis r. A separate alignment relative to the movement axis y is omitted. The clamping range between the clamping elements, meaning the doubled distance $2k$, which reflects the height of the lens frame to be clamped, is between 10 mm and 100 mm or between 17 mm and 64 mm.

It can also be advantageous if the holding device can be aligned coaxially to the rotational axis r in the direction of the first movement axis x in reference to a centering axis $z_1$ of an inscribed surface area F of a left part of a lens frame to be mounted, as well as also in reference to a centering axis $z_2$ of an inscribed surface area F of a right part of a lens frame to be mounted. A reclamping of the lens frame for the purpose of measuring both frame parts of a lens frame is therefore no longer necessary. The centering along the second movement axis y has already taken place by means of the clamping elements, as previously described.

In this context provision can advantageously be made that the value of the distance a of the clamping elements, with reference to the movement axis x, is not less than between 2 cm and 7 cm or between 3 cm and 7 cm, and does not exceed a value between 7 cm and 10 cm. The lower limit is due to the nose piece that is disposed between the two holder parts and which must be left out because it is not suitable, due to its shape, for the previously described clamping, which is symmetric in reference to the rotational axis r. The reason for the upper limit is the required open space for the spectacle frame bows on the one hand, and the applicability to smaller spectacle frames on the other, for example for children.

It can be of particular importance for the present invention if the movement axis x is superimposed on the rotational axis r, so that drive means of the movement axis x are rotatable about the rotational axis r. Consequently more open space can be realized on the side of the movement axis x for the spectacle frame bows.

In the context of the embodiment and arrangement according to the invention it can be advantageous if partitioning means are provided, by means of which the part of the lens frame to be wetted can be partitioned relative to the measuring assembly.

The part of the lens frame to be wetted can also involve simply a section of the respective right part or the left part of the lens frame. For the purpose of assuring a partitioning of the moving parts brush strips or similar can be used. For transparent of strongly reflecting surfaces the coating or wetting of the surface with a coating unit is necessary in order to assure a diffuse reflection. One possibility of coating is the use of water vapor that precipitates on the comparatively cooler lens frame as condensate. The vapor can also be provided in the form of warm air with sufficiently high moisture, to the extent that sufficient cooling of the air at the lens frame is assured. Other wetting agents such as powder or dust can also be used.

Furthermore it can be advantageous if collecting means are provided for fluids, by means of which accumulating condensate from the area of the holding device or from the climate box formed there by the partitioning means can be discharged and/or stored.

Furthermore it can be advantageous if the lens frame can be illuminated by means of the light source directly with the light beam, wherein the light source can be positioned at a distance $L1>0$ to the inscribed surface area F in reference to the direction of a surface normal N to the inscribed surface area F, and that the light reflected by the lens frame can directly impinge upon the sensor, wherein the sensor is disposed at a distance $S1>0$ to the surface area F in reference to the direction of the surface normal N. Neither the light source nor the sensor are located within the lens frame to be measured, but instead above and/or below thereof. Preferably on the same side of the lens frame. Consequently the shape of the inscribed surface area F can be detected better, in particular for significant deviations from the plane. The result is that the relative height between the lens frame and the light source or the sensor is implemented such that for any normal vector a distance L1 or $S1>=0$ is assured, so that the light beam is not partitioned off by other parts of the lens frame.

Consequently the edge of a spectacle glass or of a pair of spectacle glasses can also be measured that is fixated in the holding device by means of a corresponding adapter.

Mirrors, prisms or light guiding elements can also be considered as light sources that redirect the emitted light onto the frame as desired. Mirrors, prisms or light guiding elements can also be considered that redirect the reflected light toward the sensor.

Furthermore it can be advantageous if the light source and the sensor comprise a triangulation angle α in reference to a respective principal optical axis H4, H5, wherein a plane E spanned by the triangulation angle α is defined, and the plane E is positioned at an angle β relative to the rotational axis r or the vertical, and relative to the movement axis x or the horizontal. The angle β comprises a value between 10° and 40° or between 20° and 30° or 25°. The arrangement assures the detection of strongly curved lens frames on the one hand, as well as avoiding optical undercuts or maskings during the detection of grooves on the other.

In this context it can be advantageous if a switch box is provided that is disposed facing an operator position P in reference to the holding device. Overall this assures a space-saving assembly. The switch box can be used as storage for the monitor at the same time, but at least be disposed below it.

Provision can also be made for a second light source and a second sensor with respective distance L2 and S2, wherein the first light source forms a unit with the first sensor and the second light source forms a unit with the second sensor and wherein the first unit and the second unit are disposed on different sides of the mounted lens frame with reference to the direction of the surface normal N. Therefore a measurement from both sides is possible without undercut.

The object is also achieved by means of a method for the non-contact measuring of a lens frame, wherein the lens frame is rotated about a rotational axis r for the purpose of a circumferential measurement, wherein from the start of the measurement the rotation about the rotational axis r proceeds jolt-free, meaning with uniform acceleration or with constant rotational velocity. Consequently the changes in acceleration or velocity associated with a stepwise or discrete positioning are avoided, so that a faster and more precise measuring is assured.

The object is furthermore achieved by a method for the non-contact measuring of a lens frame, wherein the lens frame is rotated, respectively coaxially to a centering axis z1, z2 of a surface area F inscribed by the respective part of the lens frame, about a rotational axis r for the purpose of a circumferential measurement of a left part and a right part of the lens frame, wherein a) the lens frame is positioned and fixated in the direction of a movement axis y as well as in the direction of a movement axis x, perpendicular to the movement axis y and centered to the rotational axis r;

b) the lens frame is moved in the direction of a movement axis x, perpendicular to the movement axis y, for the purpose of aligning the rotational axis r with a centering axis z1 of a surface area F that is inscribed by the left part of the lens frame.

c) a subsequent alignment of the rotational axis r with a centering axis z2 of a surface area F inscribed by the right part of the lens frame takes place automatically only by means of movement in the direction of the movement axis x.

The displacement of the movement axis x from its center or zero position for the purpose of alignment of the rotational axis r with the centering axis z1 is known and detectable. Since the lens frame is fixated in the center, the displacement of the movement axis x from its center or zero position for the purpose of the alignment of the rotational axis r with the centering axis z2 is of equal magnitude, so that an automatic movement is assured.

BRIEF DESCRIPTION OF THE DRAWINGS

Additional advantages and details of the invention are explained in the patent claims and the description, and are presented in figures. In the figures:

FIG. 3a, 3b; shows a view from above;

FIG. 4: shows a partial view from above from FIG. 3a;

FIG. 5: shows a schematic diagram of the geometric placement.

DETAILED DESCRIPTION OF THE INVENTION

Figure 1:
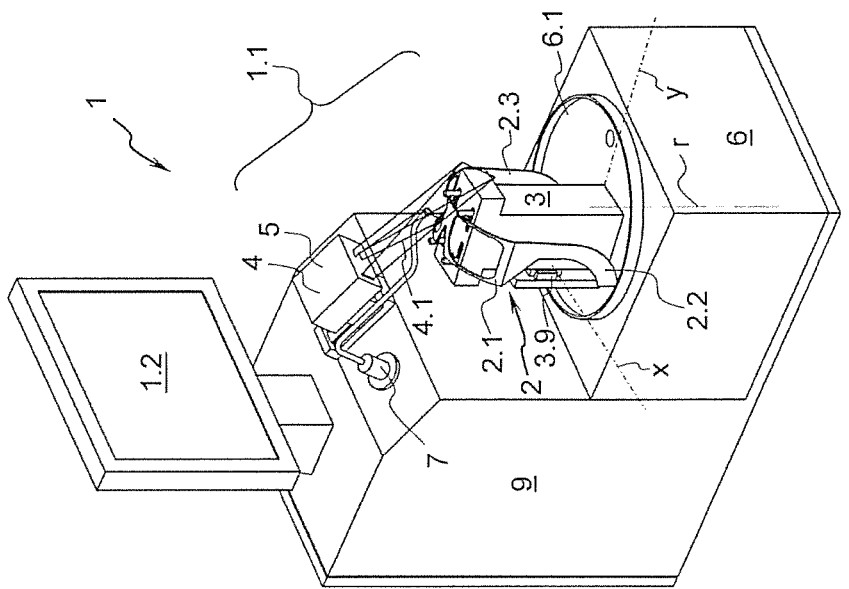
FIG. 1, 2a, 2b: shows a perspective side view of the measuring assembly.

A measuring assembly 1 shown in FIG. 1 for measuring lens frames 2.1 of a spectacle frame 2 has an evaluation unit 1.1 and a monitor 1.2 disposed behind said evaluation unit, both of which are positioned immediately above or in front of a switch box 9.

The evaluation unit 1.1 comprises a light source 4, which emits a line-shaped light beam 4.1, and a sensor 5 that detects the light of the light beam 4.1 reflected by the lens frame 2.1. The lens frame 2.1 is fixated on a holding device 3. The holding device 3 comprises a rotational axis r and is rotatable about the rotational axis r by means of drive means 6 that are not further shown. The holding device 3 is positioned on a disc bottom 6.1 that is disposed coaxially to the rotational axis r.

The holding device 3 is designed as a pedestal with height h, on which the complete spectacle frame 2 is fixated with folded-up spectacle frame bows 2.2, 2.3, wherein the spectacle frame bows 2.2, 2.3 laterally flank the pedestal. The height h of the pedestal is therefore at least as long as the length of the flanking spectacle frame bows.

Furthermore the holding device 3 comprises a movement axis x that extends perpendicular to the rotational axis r. A guide rail 3.9 is provided to facilitate movement in the direction of the movement axis x, which extends parallel to the movement axis x or forms the movement axis x. The holding device 3 that is supported in that manner is therefore rotatable about the rotational axis 6 together with the drive means 6, in reference to the movement axis x.

Furthermore the measuring assembly 1 comprises a supply line for wetting agents, in particular warm air or water vapor on the one hand and cold air or cooling means on the other, which is (are) guided, originating from the port on the housing side, directly to the area of the mounted or fixated lens frame 2.1 and there in particular to the area that is to be analyzed by the light beam 4.1. The lens frame 2.1 or parts thereof can be cooled by these means, so that a wetting of the lens frame 2.1 with condensate occurs due to the incident flow of the warm air. Excess condensate is discharged by means of a disc bottom 6.1 discharge 8.1.

The lens frame 2.1 comprises two spectacle frame bows 2.2, 2.3 that extend, originating from the upper position of the lens frame 2.1, on the holding device 3 to the side or downward. Further embodiments regarding the assembly of the holding device 3 follow as referred to in FIGS. 3a and 4.

Figure 2A:
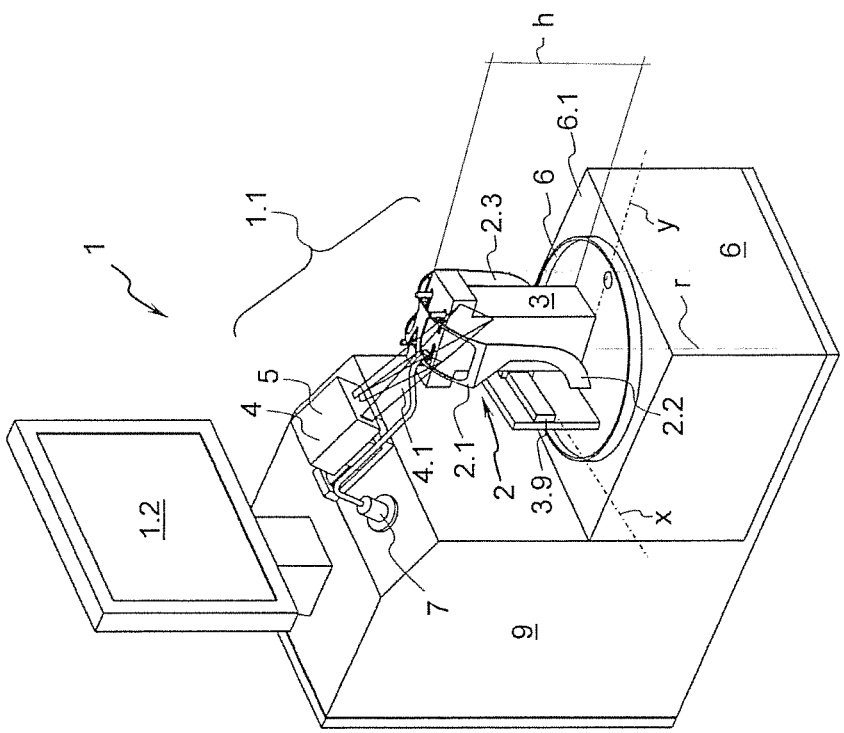

While according to the embodiment in FIG. 1 a left part 2.1a of the lens frame 2.1 is measured by means of rotation of the holding device 3 about the rotational axis r, according to the embodiment in FIG. 2a holding device 3 is located in its left position, according to the illustration, in the direction of the movement axis x, so that the evaluation of a right part 2.1b of the lens frame 2.1 is assured. The holding device 3 is rotated about the rotational axis r for the evaluation of the respective part of the lens frame 2.1 or the respective recess for the spectacle glass to be inserted.

Figure 2B:
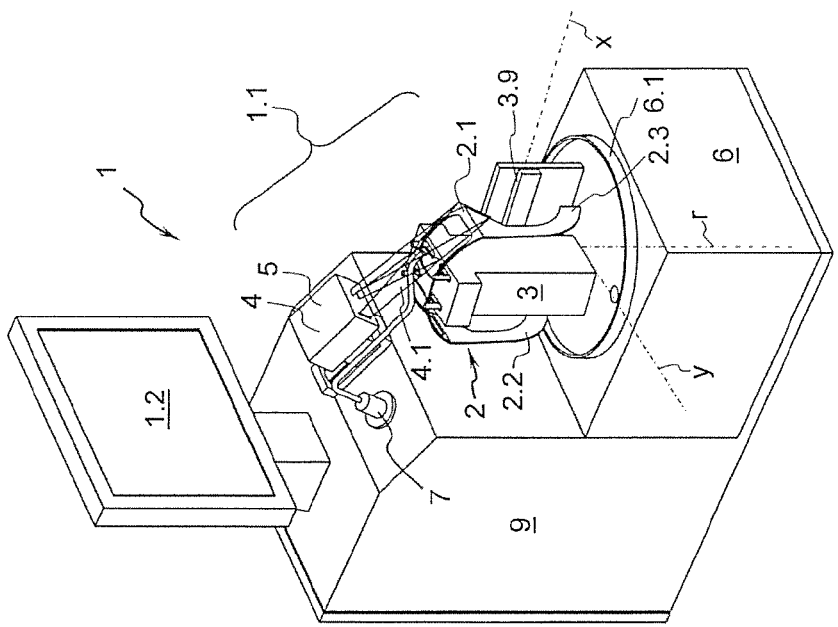

According to the embodiment in FIG. 2b the holding device 3 is located, starting from a position according to FIG. 2a, twisted by about 90° counter clockwise, so that the evaluation of the lateral flank of the lens frame 2.1, to which the spectacle frame bow 2.3 connects, is assured.

Figure 3A:
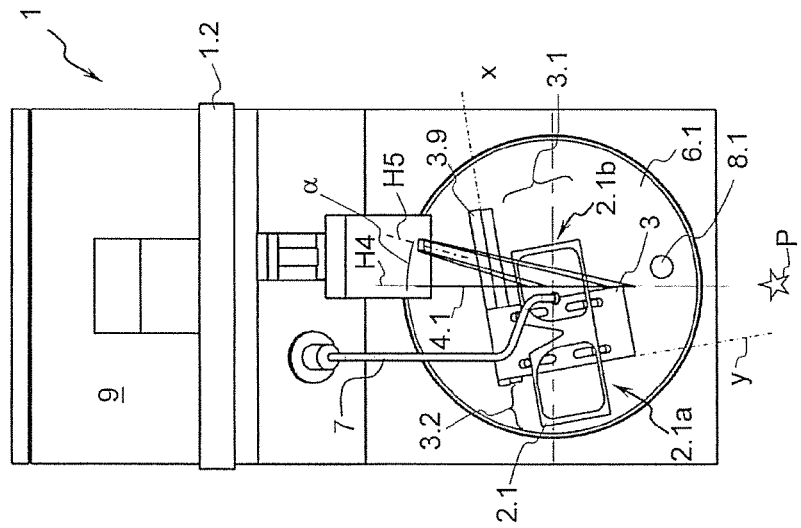

The embodiment in FIG. 3a concerns an illustration from above, concerning the situation according to FIG. 2a, meaning a measurement of an upper flank of the right part 2.1b of the lens frame 2.1. The lens frame 2.1 is positioned centered on the holding device 3, wherein the holding device 3 is displaced by means of the movement axis x in such a manner that the surface area F, which is inscribed by the right part 2.1b of the lens frame 2.1, rotates about the rotational axis r, so that an illumination of the entire interior circumferential surface or interior circumferential groove of the right part 2.1b of the lens frame 2.1 is assured.

Light source 4 comprises a main axis H4 that encompasses a triangulation angle α with a main axis H5 of the sensor 5.

A corresponding open space 3.1, 3.2 is provided in the area to the side of the holding device 3, for the purpose of receiving the spectacle frame bows 2.2, 2.3. The fact that the holding device 3 has a limited width in reference to the movement axis x assures this open space 3.1, 3.2. The lens frame 2.1 is fixated by means of four clamping elements 3.3a to 3.4b according to the detail view of FIG. 4, wherein in the area of the respective clamping element 3.3a to 3.4b a support or support surface 3.8a, 3.8b is provided. The respective clamping element 3.3a to 3.4h is pretensioned by means of spring elements 3.5a to 3.6b in a direction of a movement axis y. All four clamping elements 3.3a to 3.4b are located at the same distance k to the rotational axis r, in reference to the movement axis y. The rotational axis r coincides in the case of the measurement of the left part 2.1a of the lens frame 2.1, which is shown here, with a centering axis z1 of the surface area F inscribed by the left part 2.1a of the lens frame 2.1, so that the inscribed surface area F likewise rotates about the centering axis z1 during the rotation of the holding device 3 about the rotation axis r.

Clamping elements 3.3a, 3.3b are spaced, in reference to the clamping elements 3.4a, 3.4h, at a distance a that is somewhat larger than a not further described central nose piece of the lens frame 2.1, so that all four clamping elements 3.3a to 3.4b come in contact in the area of the respective right or left part of the lens frame 2.1. Due to the equidistant arrangement of the respective clamping elements 3.3a to 3.4b relative to the rotational axis r the lens frame 2.1, which is fixated by means of the clamping elements 3.3a to 3.4b, is also disposed centered to the rotational axis r in reference to the movement axis y. For the purpose of the correlation of the rotational axis r with the respective centering axis z1, z2 only an adjustment of the holding device 3 in reference to the movement axis x is still necessary after the equidistant clamping of the lens frame 2.1.

The evaluation area of evaluation unit 1.1 is partitioned off relative to the surroundings by means of a pot-like partitioning means 8 according to the embodiment of FIG. 3b. Partitioning means 8 is preferably disposed in a stationary manner, so that the disc bottom 6.1 of the drive means 6 can be rotated together with the holding device 3 within the partitioning means 8 about the rotational axis r, as well as also be moved in the direction of the movement axis x. Light source 4 as well as also sensor 5 and supply line 7 for wetting agents are introduced laterally in the radial direction into the pot-like partitioning means 8. Partitioning means 8 that only partition a part of lens frame 2.1 are designed correspondingly smaller.

The switch box 9 is located, in reference to the evaluation unit 1.1, facing an operator position P, so that the machine width of the described measuring assembly 1 is comprehensively optimized.

FIG. 5 clarifies the geometric, relations between light source 4 and sensor 5 on the one hand, as well as the surface area F inscribed by the lens frame 2.1 According to FIG. 5 light source 4 emits a line-shaped light beam 4.1 in the direction of its main axis H4 onto the edge of the lens frame 2.1, which is not shown, or the inscribed surface area F shown here of said lens frame. In reference to a surface normal N to this fictitious inscribed surface area F both light source 4 as well as also sensor 5 have a distance of L1 and S1. Light source 4 as well as sensor 5 are positioned at an angle β of about 25° in reference to a support plane E or usually the horizontal.

Due to the previously described distance L1, S1 on the one hand and the likewise described positioning angle β it is possible to detect the outer contour of inscribed surface areas F or correspondingly the interior contour of the lens frame that inscribes this surface area by means of the line-shaped light beam 4.1, even if these have a significant edge curvature or curvature on the whole, as shown in FIG. 5.

Clamping elements 3.3a to 3.4b are movable in the direction of the movement axis y, as shown in reference to displacement direction v, and can be pretensioned by means of the spring elements 3.5a to 3.6b against the lens frame 2.1 to be clamped. The pretensioning means 3.5a to 3.6b are designed identically, so that an identical pretension and therefore an equidistant alignment in reference to the rotational axis r in the direction of the movement axis y results for all four clamping elements 3.3a to 3.4b.

What is claimed is:

1. A measuring assembly for optically measuring an inside of a lens frame of a spectacle frame, said lens frame at least partially delimiting an inscribed surface area F that corresponds to a lens shape, comprising a holding device for mounting the spectacle frame, at least one light source for generating a light beam to be projected on a region of the lens frame to be evaluated, and at least one sensor that can be coupled with an evaluation unit for detecting the reflected light beam, wherein the holding device and the light source can be rotated relative to one another about a rotational axis r and moved in the direction of a movement axis x, and the movement axis x comprises at least one movement component in a direction perpendicular to the rotational axis r, wherein the holding device comprises at least two clamping element for fixating the lens frame, said clamping elements being movable in a direction of a movement axis y comprising a movement component at right angles to the movement axis x and comprising a movement component at right angle to the rotational axis r, and said clamping elements being pretensionable against the spectacle frame.

2. The measuring assembly according to claim 1, wherein the clamping elements comprise drive and/or pretensioning means, wherein the respective clamping element has the same pretension and/or the same distance k in the direction of the movement axis y in reference to the direction of the movement axis y while the lens frame is fixated.

3. The measuring assembly according to claim 2, wherein the holding device can be aligned coaxially to the rotational axis r in the direction of the first movement axis x in reference to a centering axis z1 of an inscribed surface area F of a left part of a lens frame to be mounted, as well as also in reference to a centering axis z2 of an inscribed surface area F of a right part of a lens frame to be mounted.

4. The measuring assembly according to claim 2, wherein collecting means are provided for fluids by which accumulating condensate from the area of the holding device can be discharged and/or stored.

5. The measuring assembly according to claim 2, wherein the lens frame can be illuminated by means of the light source directly with the light beam, wherein the light source can be positioned at a distance L1 to an inscribed surface area F in reference to the direction of a surface normal N to the inscribed surface area F, and that the light reflected by the lens frame can directly impinge upon the sensor, wherein the sensor is disposed at a distance S1 to the surface area F in reference to the direction of the surface normal N.

6. The measuring assembly according to claim 1, wherein the clamping elements comprise a distance a in reference to the movement axis x that does not exceed a value of between 1 cm and 10 cm.

7. The measuring assembly according to claim 6, wherein the clamping elements comprise a distance a in reference to the movement axis x that does not exceed a value of between 2.5 cm and 6.5 cm or 4.5 cm.

8. The measuring assembly according to claim 6, wherein the movement axis x is superimposed on the rotational axis r, so that a drive means of the movement axis x can be rotated about the rotational axis r.

9. The measuring assembly according to claim 1, wherein the movement axis x is superimposed on the rotational axis r, so that a drive means of the movement axis x can be rotated about the rotational axis r.

10. The measuring assembly according to any one of the preceding claims claim 1, wherein partitioning means are provided by which the part of the lens frame to be wetted can be partitioned off relative to the measuring assembly.

11. The measuring assembly according to claim 1, wherein the light source and the sensor comprise a triangulation angle α in reference to a respective principal optical axis H4, H5, wherein a plane E spanned by the triangulation angle α is defined, and the plane E is positioned at an angle β relative to the rotational axis r (vertical) and relative to the movement axis x (horizontal).

12. The measuring assembly according to claim 1, wherein a switch box is provided that is disposed facing an operator position P in reference to the holding device.

13. The measuring assembly according to claim 1, wherein the holding device can be aligned coaxially to the rotational axis r in the direction of the first movement axis x in reference to a centering axis z1 of an inscribed surface area F of a left part of a lens frame to be mounted, as well as also in reference to a centering axis z2 of an inscribed surface area F of a right part of a lens frame to be mounted.

14. The measuring assembly according to claim 1, wherein collecting means are provided for fluids by which accumulating condensate from the area of the holding device can be discharged and/or stored.

15. The measuring assembly according to claim 1, wherein the lens frame can be illuminated by means of the light source directly with the light beam, wherein the light source can be positioned at a distance L1 to an inscribed surface area F in reference to the direction of a surface normal N to the inscribed surface area F, and that the light reflected by the lens frame can directly impinge upon the sensor, wherein the sensor is disposed at a distance S1 to the surface area F in reference to the direction of the surface normal N.

16. The measuring assembly according to claim 15, wherein the light source and the sensor comprise a triangulation angle α in reference to a respective principal optical axis H4, H5, wherein a plane E spanned by the triangulation angle α is defined, and the plane E is positioned at an angle β relative to the rotational axis r (vertical) and relative to the movement axis x (horizontal).

* * * * *